US006055809A

United States Patent [19]

Kishi et al.

[11] Patent Number: 6,055,809

[45] Date of Patent: May 2, 2000

[54] REMOTE STEERING SYSTEM WITH A SINGLE ROD CYLINDER AND MANUAL HYDRAULIC PISTON PUMP FOR SUCH A SYSTEM

[75] Inventors: Seiichi Kishi, Kakogawa; Taizo Kitano, Kako-gun, both of Japan

[73] Assignee: Marol Kabushiki Kaisha, Kobe, Japan

[21] Appl. No.: 09/024,261

[22] Filed: Feb. 17, 1998

[51] Int. Cl.[7] ...... F16D 31/02

[52] U.S. Cl. ...... 60/475; 60/476; 91/487; 91/503; 417/270; 417/297

[58] Field of Search ...... 91/487, 503; 60/385, 60/475, 476, 486; 417/270, 280, 291, 297

[56] References Cited

U.S. PATENT DOCUMENTS

| | | | |
|---|---|---|---|
| 2,802,426 | 8/1957 | Garwood | 91/503 |
| 3,271,954 | 9/1966 | Marsee et al. | 60/475 |
| 3,411,294 | 11/1968 | Hedermann | 60/476 |
| 3,587,235 | 6/1971 | Goff et al. | 60/475 |
| 3,738,228 | 6/1973 | Harrison | 417/291 |
| 4,961,316 | 10/1990 | Corke et al. | 60/475 |
| 5,285,641 | 2/1994 | Goto et al. | 417/270 |

FOREIGN PATENT DOCUMENTS

| | | | |
|---|---|---|---|
| 2213414 | 10/1972 | Germany | 91/487 |
| 164574 | 7/1991 | Japan | 417/270 |

*Primary Examiner*—F. Daniel Lopez

*Attorney, Agent, or Firm*—Marshall, O'Toole, Gerstein, Murray & Borun

[57] ABSTRACT

A hydraulic piston pump 1 includes a distributing valve 11 having a pair of arcuate or circular ports 11*a* and 11*b* formed through it. The arcuate port 11*b* is shorter circumferentially than the arcuate port 11*a* to reduce, by a predetermined amount, the amount of pressure oil to be discharged from and sucked into the pump through it. The valve 11 also has a pair of tank ports 11*c* and 11*d* formed through it circumferentially on both sides of the shorter port 11*b*. The circumferential dimensions of the tank ports 11*c* and 11*d* correspond to the predetermined amount of oil.

14 Claims, 9 Drawing Sheets

REMOTE STEERING SYSTEM WITH A SINGLE ROD CYLINDER AND MANUAL HYDRAULIC PISTON PUMP FOR SUCH A SYSTEM

BACKGROUND OF THE INVENTION

1. Field of the Invention

The present invention relates to a remote steering system for remotely and hydraulically operating the outboard motor or engine and/or the rudder mainly of a small boat or watercraft. In particular, the invention relates to a system for remote steering with a single-rod cylinder, and to a hydraulic piston pump (also referred to as a helm pump) suitable for the system.

2. Description of Related Art

In general, as shown in FIGS. 7A and 7B of the accompanying drawings, a double rod cylinder 61 has conventionally been used for a remote steering system 60 of the type mentioned first herein. The cylinder 61 includes a body 61*a* fixed to the hull of a boat near the stern. The cylinder body 61*a* has an A port 61*c* and a B port 61*d*. The boat includes an outboard motor (not shown) mounted on the stern. The motor has a tiller 62 connected to one end of the piston rod 61*b* of the cylinder 61. The system 60 includes a steering wheel 63 and a manual hydraulic piston pump 70, which is mounted in the hull near the bow or stem. The pump 70 has an A port 71 and a B port 72, which are connected to hydraulic oil pipes 73 and 74, respectively. The other ends of the pipes 73 and 74 are connected to the cylinder ports 61*d* and 61*c*, respectively. As shown in FIG. 8 of the drawings, the hydraulic piston pump 70 may be a ball piston pump. In this case, the pump 70 includes a driving shaft 76, which can be turned with the steering wheel 63 (FIG. 7A). The pump 70 also includes a cylinder block 77, which can be turned with the shaft 76. The pump 70 has cylinders 78, in each of which a ball piston 79 can reciprocate. The pump 70 further includes a bearing type swash plate 80. The piston 79 is urged against the swash plate 80 by a spring 81. As the cylinder block 77 turns, the piston 79 can be pushed by the swash plate 80 to move axially in the associated cylinder 78 against the force of the spring 81. The pump 70 still further includes a distributing valve 82. As shown in FIG. 9B of the drawings, the valve 82 has an A port 83 and a B port 84. While the ball pistons 79 of the pump 70 are moving, pressure oil is discharged through one of the valve ports 83 and 84 (for example, the A port 83) into the associated port 61*c* or 61*d* (for example, the B port 61*d*) of the double rod cylinder 61, and pressure oil is sucked from the other cylinder port 61*c* or 61*d* through the other valve port 83 or 84 into the pump 70. This moves the piston rod 61*b* in the direction opposite to the direction in which the wheel 63 turns, thereby changing the direction in which the boat moves. In both directions in which the wheel 63 turns, the distances over which the rod 61*b* moves are equal to each other and proportional to the number of revolutions of the wheel 63.

The pump 70 may, in place of such a hydraulic pump of the ball piston and side plate type, be a hydraulic pump of the plunger and pintle type.

The inner side of the pump swash plate 80, which is in contact with the pistons 79, is a flat surface. As shown in FIG. 9B, the valve ports 83 and 84 are circular or arcuate and laterally symmetric. Accordingly, when one of the cylinders 78 turns by an angle of 360 degrees, as shown in FIG. 9A, the strokes of the associated piston 79 are equal on both sides of the angular position of the cylinder 78 at 180 degrees.

The free end of the piston rod 61*b* protrudes from the cylinder body 61*a*, and may interfere with the hull.

FIGS. 6A and 6B of the drawings show a remote steering system 30 with a single rod cylinder 31. This cylinder 31 includes a body 31*a* and a piston rod 31*b*. Only one end of the rod 31*b* protrudes from the cylinder body 31*a*, and is connected to the tiller 62 of an outboard motor, which is mounted on the hull A of a boat. Therefore, the rod 31*b* does not interfere with the hull. Besides, only a small space is necessary for mounting the cylinder 31.

As apparent from FIG. 6B, the amount of pressure oil necessary for moving the piston rod 31*b* to the right is smaller by the volume of part of the rod than that necessary for moving it to the left. For instance, six revolutions of the steering wheel 40 are necessary for moving the rod 31*b* over the whole stroke to the left, and three revolutions are necessary for moving it over the whole stroke to the right. Therefore, when the tiller 62 is turned from its neutral position to steer the boat, the rudder angle corresponding to a particular number of revolutions of the wheel 40 which is necessary for steering the boat to the right differs from that corresponding to the same number of revolutions for steering it to the left. Consequently, the operation of the wheel 40 is very difficult and needs skill.

SUMMARY OF THE INVENTION

It is an object of the invention to provide a remote steering system which includes a single rod cylinder, and by which a rudder can be steered easily. The system is coupled to a steering wheel. Whichever direction the wheel is turned in, the same number of revolutions of the wheel moves the piston rod of the cylinder by the same length in both directions.

It is another object to provide a hydraulic piston pump which is suitable for such a system, cheap, simple in structure, and easy to make.

In accordance with a first aspect of the invention, a remote steering system is provided for operating a rudder remotely in accordance with the direction of rotation and the number of revolutions of a steering wheel. The system includes a hydraulic piston pump which can be driven by the wheel. The system also includes a hydraulic single rod cylinder connected to the pump. The cylinder has a piston rod, which requires different amounts of pressure oil for the same length of movement in opposite directions. Whichever direction the wheel turns in, the pump discharges the required amount of pressure oil so that the same number of revolutions of the wheel in both directions moves the piston rod by the same distance in both directions. Therefore, the operation of this system is simple and needs no skill.

This system has substantially the same structure as a conventional remote steering system with a single rod cylinder has, except that only the manual hydraulic piston pump is replaced. Therefore, the system is not complicated in structure, and it is possible to provide the newest remote steering system cheaply.

The hydraulic piston pump may include a distributing valve having a pair of first ports and a second port all formed in it. The amount of pressure oil to be discharged from and sucked into the pump is controlled through one of the first ports in accordance with the ratio of the amount of pressure oil necessary to move the piston rod by a distance in a direction to that necessary to move the rod by the same distance in the opposite direction. The second port has a size corresponding to the controlled amount of pressure oil.

The single rod cylinder has a pair of chambers formed on both sides of its piston. The chambers differ in volume when the piston is positioned in the middle of the cylinder. The excess oil depending on the difference in volume between the chambers is discharged into or sucked from a tank through the tank port of the distributing valve. Therefore, the required number of revolutions of the steering wheel is equal in both directions.

In accordance with a second aspect of the invention, a manual hydraulic piston pump is provided. The pump includes a generally cylindrical cylinder block having a plurality of cylinders formed around its axis at circumferential intervals. A piston can reciprocate in each cylinder. The pump also includes a swash plate positioned at one end of the cylinder block. Each piston is urged by a spring toward and against the swash plate. The pump further includes a distributing valve positioned at the other end of the cylinder block. This valve has a pair of arcuate ports and a pair of tank ports. The cylinder block can turn around its axis relatively to at least part of the swash plate and the distributing valve. While the cylinder block is turning, each of the cylinders can communicate with one of the ports of the distributing valve. A flow control valve having a pilot is connected to the arcuate ports of the distributing valve. A tank is formed in the pump, and communicates with the tank ports of the distributing valve. While the cylinder block is turning, the pistons are moved axially in the cylinders to discharge pressure oil from at least one of the cylinders through at least one of the ports of the distributing valve and, on the other hand, to suck pressure oil through at least one other port into at least one other cylinder. One of the arcuate ports is shorter circumferentially than the other to reduce, by a predetermined amount, the amount of pressure oil to be discharged from and sucked into the pump therethrough. The tank ports are positioned circumferentially on both sides of the shorter arcuate port, and have circumferential dimensions corresponding to the predetermined amount of oil.

This manual hydraulic piston pump may be used in a remote steering system with a single rod cylinder, which has a pair of chambers formed on both sides of its piston. The chambers differ in volume when the piston is positioned in the middle of the cylinder. In this case, when pressure oil is supplied to the smaller cylinder chamber, the excess part of the oil from the pump is shunted through one or both of the tank ports of the distributing valve to the tank in the pump so that the amount of pressure oil being supplied to this chamber is controlled. On the other hand, when pressure oil is supplied to the larger cylinder chamber, all the oil from the pump is discharged into this chamber without being shunted to the pump tank. Therefore, the movement of the piston rod over the same distance in both directions requires an equal number of revolutions of the steering wheel in both directions.

It is preferable that the swash plate should have a cam face for making each of the pistons substantially immovable for a range of rotation of the cylinder block where the piston changes its direction of movement. The pump piston strokes may be adapted as shown in FIG. 3A of the drawings, to prevent each of the pump cylinders from changing over between the valve ports when the associated piston changes its direction of movement. This makes the piston movement continuous and smooth.

In accordance with a third aspect of the invention, another manual hydraulic piston pump is provided. This pump includes a generally cylindrical cylinder block having a plurality of cylinders formed around its axis at circumferential intervals. The block also has cylinder ports formed in its one end, each of which communicates with one of the cylinders. A piston can reciprocate in each cylinder. The pump also includes a swash plate positioned at the other end of the cylinder block. Each piston is urged by a spring toward and against the swash plate. The pump further includes a distributing valve positioned at the one end of the cylinder block. This valve has a pair of first arcuate ports and a second arcuate port. The cylinder block can turn around its axis relatively to at least part of the swash plate and the distributing valve. While the cylinder block is turning, each of the cylinder ports can communicate with one of the ports of the distributing valve. A flow control valve having a pilot is connected to the first ports of the distributing valve. The pump has a tank communicating with the second port of the distributing valve. While the cylinder block is turning, the pistons are moved axially in the cylinders to discharge pressure oil from at least one of the cylinders through at least one of the ports of the distributing valve and, on the other hand, to suck pressure oil through at least one other port into at least one other cylinder. One of the first ports is narrower than the other to reduce, by a predetermined amount, the amount of pressure oil to be discharged from and sucked into the pump therethrough. The second port has a circumferential length corresponding to the predetermined amount. The wider first port extends on both of two circles which are concentric with the cylinder block and different in diameter. The narrower first port extends on one of the circles. The second port extends on the other circle. Each cylinder port is positioned on one of the circles. At least one of the cylinder ports is positioned on one of the circles. At least one other cylinder port is positioned on the other circle.

As is the case with the pump in the second aspect of the invention, the pump in the third aspect shunts to its tank and sucks from the tank, through the second port of the distributing valve, the excess amount of oil depending on the difference in volume between the chambers of the single rod cylinder connected to the pump. Therefore, if this pump is used in the remote steering system in the first aspect, the movement of the piston rod over the same distance in both directions needs an equal number of revolutions of the steering wheel in both directions.

In accordance with a fourth aspect of the invention, still another manual hydraulic piston pump is provided. This pump includes a generally cylindrical cylinder block having first cylinders formed at intervals on a first circle, which is concentric with the block, and second cylinders formed at intervals on a second circle, which is concentric with and smaller in diameter than the first circle. A piston can reciprocate in each of the cylinders. The pump also includes a swash plate positioned at one end of the cylinder block. Each piston is urged by a spring toward and against the swash plate. The pump further includes a distributing valve positioned at the other end of the cylinder block, and has a pair of first arcuate ports, a second arcuate port and a third arcuate port. One of the first ports extends on a first circle, which is concentric with the cylinder block. The second port extends on a second circle, which is concentric with and smaller in diameter than the first circle. The other first port extends on one of the first and second circles, and the third port extends on the other circle. The cylinder block can turn around its axis relatively to at least part of the swash plate and the distributing valve. While the cylinder block is turning, each of the cylinders can communicate with one of the ports of the distributing valve. A flow control valve having a pilot is connected to the first and second ports of the distributing valve. The pump has a tank communicating with the third port of the distributing valve. While the cylinder block is turning, the pistons are moved axially in the cylinders to discharge pressure oil from at least one of the cylinders through at least one of the ports of the distributing valve and, on the other hand, suck pressure oil through at least one other port into at least one other cylinder.

This pump may be used in the remote steering system in the first aspect of the invention. In this case, when pressure oil is supplied to the smaller chamber of the single rod cylinder, the excess oil depending on the difference in volume between the cylinder chambers is discharged through the third valve port into the tank. Therefore, the required number of revolutions of the steering wheel is equal in both directions. Although this pump is complicated somewhat in structure, the pump pistons can move continuously and smoothly even if the swash plate does not have a special cam face for modifying the conventional piston strokes.

BRIEF DESCRIPTION OF THE DRAWINGS

Preferred embodiments of the invention are shown in the accompanying drawings, in which.

DETAILED DESCRIPTION OF PREFERRED EMBODIMENTS

Figure 1A:
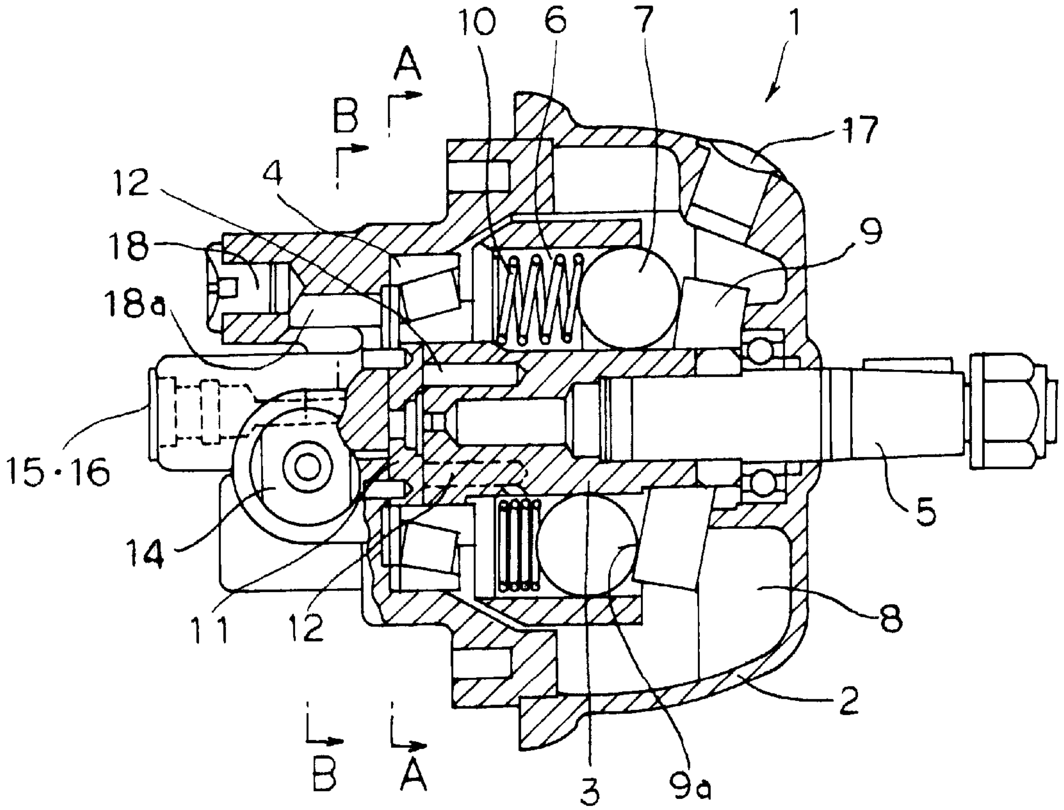
FIG. 1A is a central axial cross section of a hydraulic piston pump of the axial ball piston and side plate type according to the first embodiment.

As shown in FIG. 1A, a hydraulic piston pump 1 of the axial ball piston and side plate type according to the invention includes a housing 2 and a cylinder block 3. The block 3 is housed in the housing 2 rotatably through a radial bearing 4. A driving shaft 5 extends through the front end of the housing 2 coaxially with the cylinder block 3. The inner end of the shaft 5 is fixed to the cylinder block 3. Fixed to the shaft 5 is a steering wheel 40 (FIG. 6A), which can be rotated manually to turn the cylinder block 3. The cylinder block 3 has cylinders 6, which may be five or seven in number, formed axially in it at circumferential intervals around the shaft 5. A ball piston 7 can slide axially in each cylinder 6. The housing 2 has an oil tank 8 formed in it, and houses a cam plate 9 fixed to its front portion.

Figure 2:
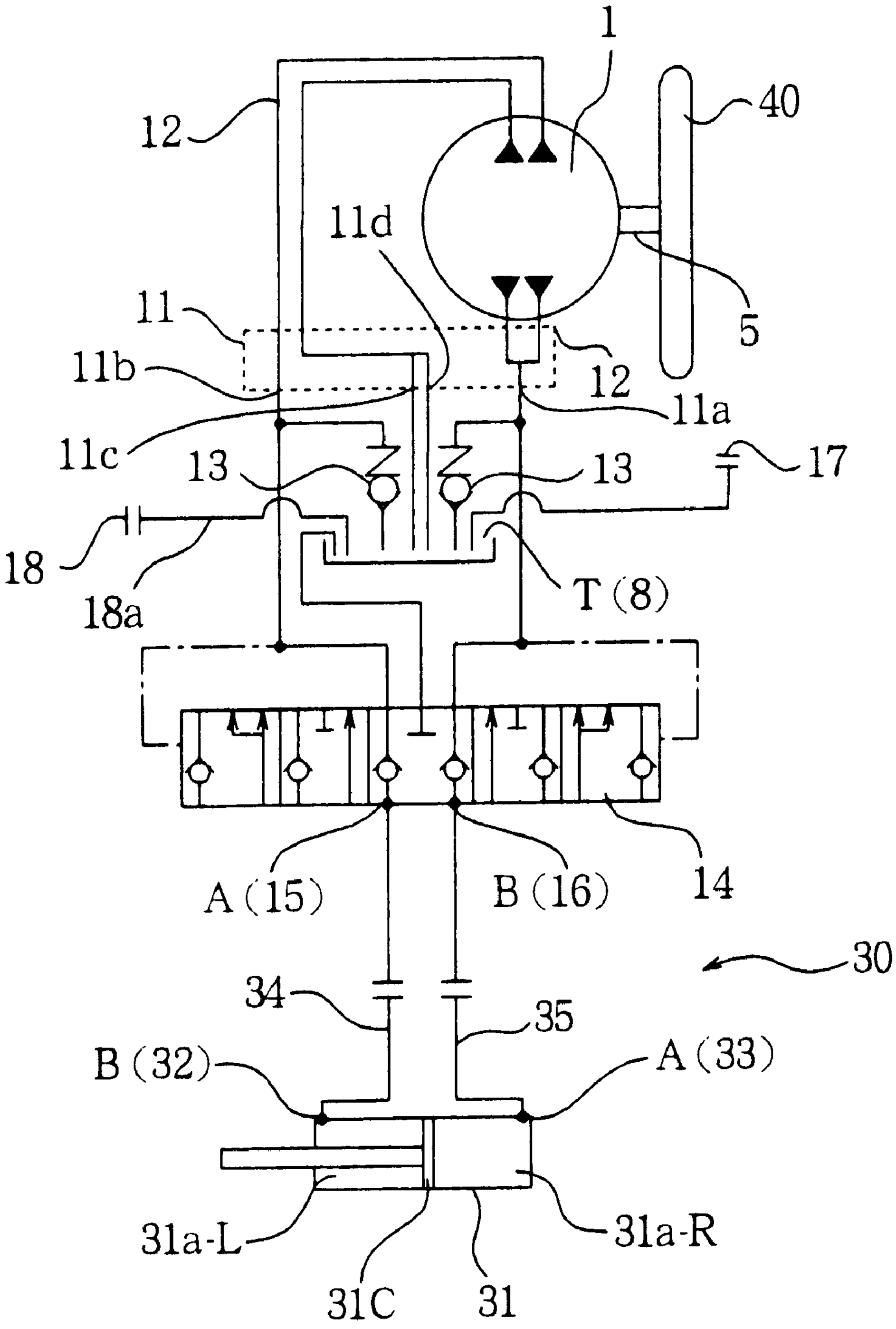
FIG. 2 is a hydraulic system diagram of a remote steering system of the single rod cylinder type, which includes the pump shown in FIGS. 1A and 1B.

Fitted in each cylinder 6 is a coil spring 10 on the back side of the associated piston 7. The spring 10 urges the piston 7 forward to bring the piston into slidable contact with the inner side of the cam plate 9. As stated later, the inner side of the cam plate 9 is a wavy cam face 9*a* for moving the pistons 7 in parallel with the shaft 5. The housing 2 also houses a side plate type distributing valve 11 fixed to it on the back side of the cylinder block 3. The cylinder block 3 also has oil passages 12 formed in it. Each passage 12 communicates with one of the cylinders 6, and is connected to the valve 11. The housing 2 supports a flow control valve 14 behind the distributing valve 11. This control valve 14 has a pilot, and can slide radially of the shaft 5. As shown in FIG. 2, the valves 11 and 14 are connected through two oil passages, which are each connected to the tank 8 through a suction type check valve 13. The pump 1 has an A port 15 and a B port 16 (pump ports) which are formed in its back end behind the control valve 14. When the pump 1 starts to operate, the check valves 13 are opened to extract air from the pump cylinders 6 etc. Oil is sucked from the tank 8 through the opened valves 13 into the pump 1.

Figure 3A:
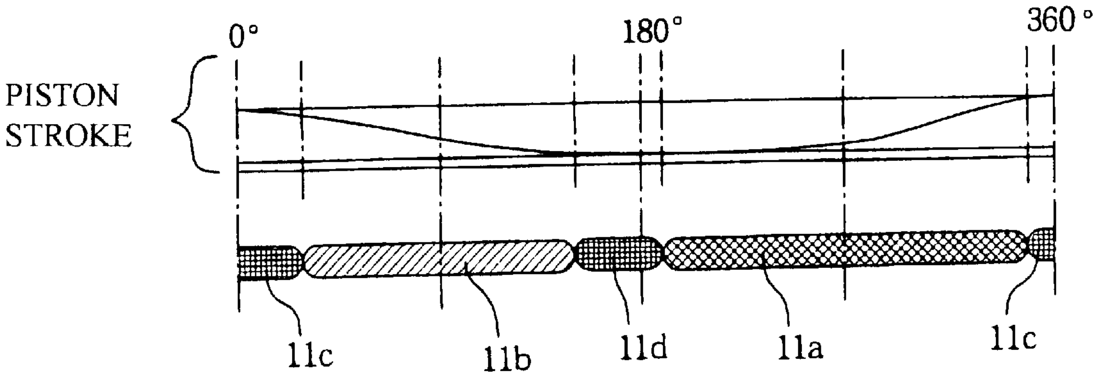
FIG. 3A is a chart or diagram showing the relationship between each piston stroke of the pump shown in FIGS. 1A and 1B and each oil passage of the distributing valve of the pump.
Figure 3B:
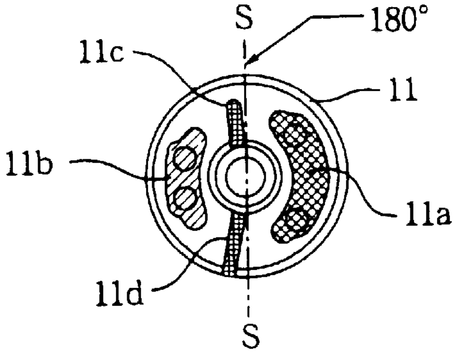
FIG. 3B is a partial cross section taken along line A—A of FIG. 1A, showing the distributing valve.
Figure 9A:
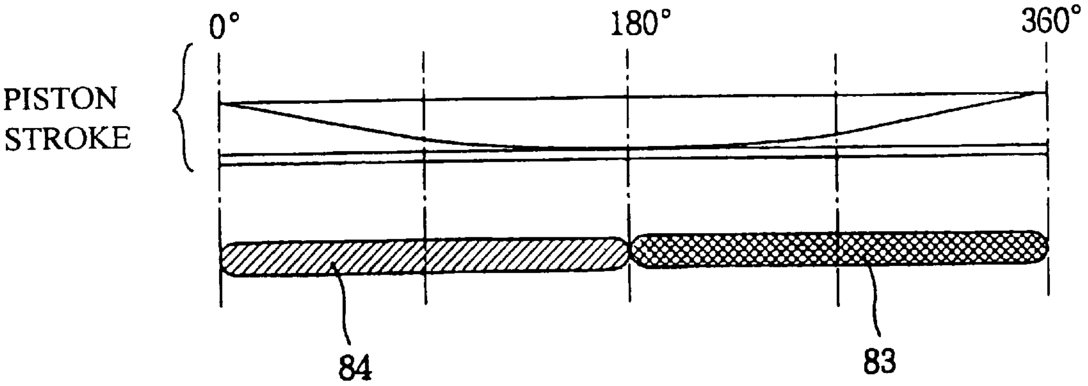
Fig.9A PRIOR ART
FIG. 9A is a chart or diagram showing the relationship between each piston stroke of the pump shown in FIG. 8 and each oil passage of the distributing valve of this pump.
Figure 9B:
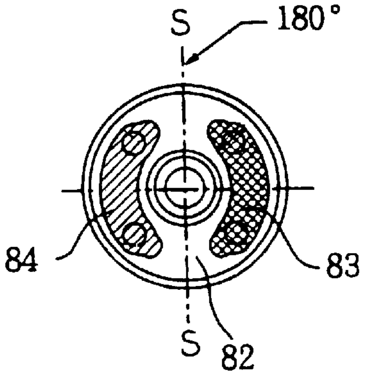
Fig.9B PRIOR ART
FIG. 9B is a partial cross section taken along line A—A of FIG. 8, showing the distributing valve.

As shown in FIG. 3B, the distributing valve 11 has an A port 11*a* and a B port 11*b* which are formed through it on the right and left, respectively, of its center line S—S. These valve 11*a* and 11*b* are circular or arcuate. The A port 11*a* is longer circumferentially (larger angularly) than the B port 11*b*. This valve 11 also has two narrow tank ports 11*c* and 11*d* which are formed through it circumferentially on both sides of the B port 11*b* and near the center line S—S. The tank ports 11*c* and 11*d* communicate with the tank 8. The A port 11*a* is identical to the A port of the conventional valve shown in FIG. 9B. The cam face 9*a* of the cam plate 9 has a series of waves for controlling the strokes of the pistons 7 in such a manner that the strokes are as shown in FIG. 3A. If the strokes were conventional as shown in FIG. 9A, each cylinder 6 would change over from the B port 11*b* to the tank port 11*c* or 11*d* at its position where the associated piston 7 changes the direction of piston movement. As a result, the piston movement would be discontinuous, and therefore pressure oil would not be discharged smoothly. As shown in FIG. 3A, each piston stroke is modified to be zero or nearly zero at the cylinder position where the associated piston 7 changes its direction of movement. As a result, the piston movement is continuous, and therefore pressure oil can be discharged smoothly.

Figure 1B:
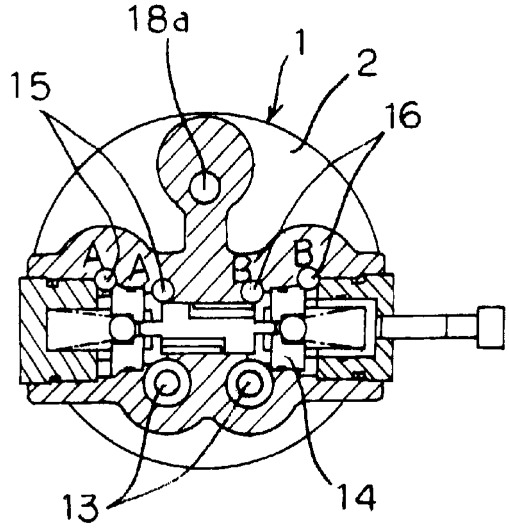
FIG. 1B is a cross section taken along line B—B of FIG. 1A.

As shown in FIGS. 1A, 1B and 2, the housing 2 has two oil supply ports 17 and 18, and an oil supply passage 18*a*, which connects the port 18 and the tank 8.

Figure 6A:
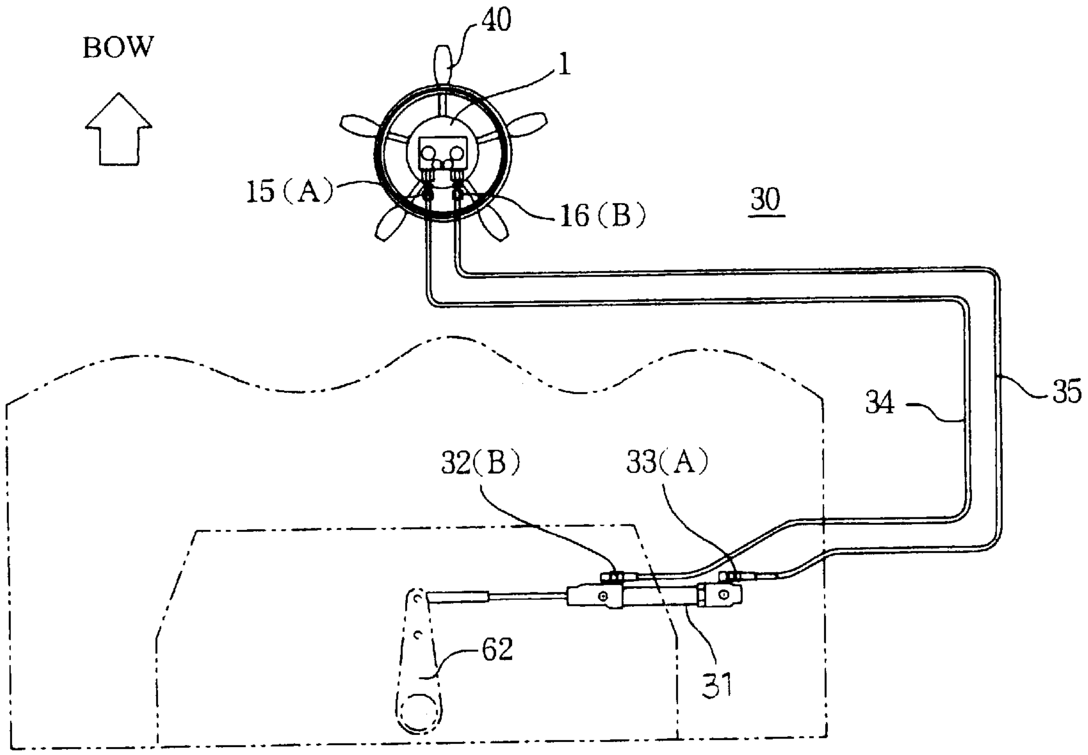
FIG. 6A is a schematic view of a general remote steering system of the single rod cylinder type, which includes a manual hydraulic piston pump according to the invention.

The hydraulic piston pump 1 is used as the manual hydraulic piston pump in the remote steering system 30 shown in FIG. 6A. The A port 15 of the pump 1 is connected through a hydraulic oil pipe 34 to the B port 32 of the single rod cylinder 31. The B port 16 of the pump 1 is connected through a hydraulic oil pipe 35 to the A port 33 of the cylinder 31. When the steering wheel 40, which is fixed to the driving shaft 5, is positioned at its neutral position (0 degree in FIG. 3A), the ball piston 7 of the top cylinder 6 of the pump 1 is positioned at its top dead point, as shown in FIG. 1. When the wheel 40 is rotated counterclockwise from the neutral position, and this cylinder 6 has exceeded an angle of rotation of 10 degrees, the piston 7 starts to move backward. The backward movement of the piston 7 discharges pressure oil from the cylinder 6 through the tank port 11*c* of the distributing valve 11 into the tank 8. Thereafter, this movement discharges pressure oil from the cylinder 6 through the B port 11*b* of the valve 11, the flow control valve 14 and the A port 15 of the pump 1 into the B port 32 of the single rod cylinder 31. Until the cylinder 6 turns by about 160 degrees, pressure oil is kept discharged into the B port 32. Thereafter, pressure oil is discharged through the tank port 11*d* again into the tank 8. When the pump cylinder 6 is positioned at about 190 degrees, the piston 7 changes its direction of movement and starts to move forward. This starts to suck pressure oil from the single rod cylinder 31 through the A port 33, the B port 16, the control valve 14 and the A port 11*a* into the pump 1.

Figure 6B:
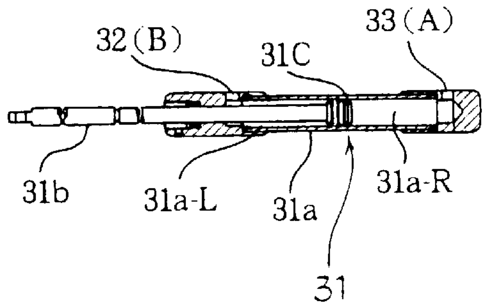
FIG. 6B is an axial cross section of the single rod cylinder shown in FIG. 6A.
Figure 7A:
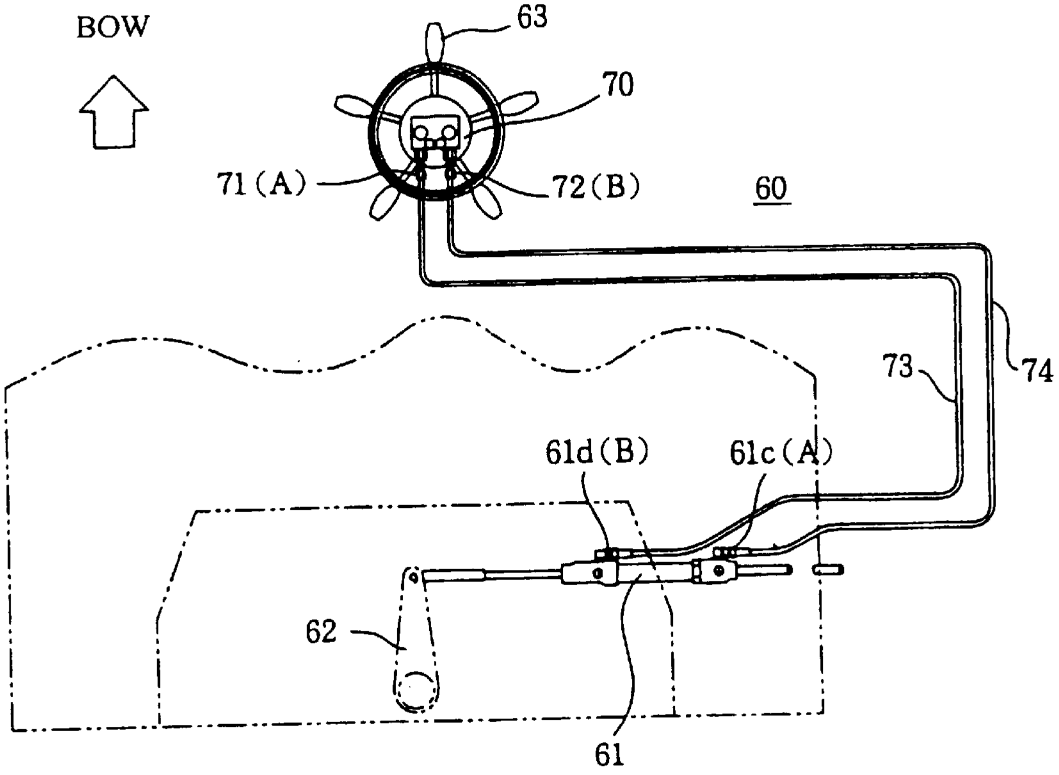
Fig.7A PRIOR ART
FIG. 7A is a schematic view of a general remote steering system of the double rod cylinder type.
Figure 7B:
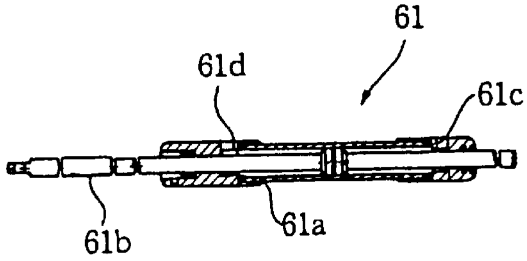
Fig.7B PRIOR ART
FIG. 7B is an axial cross section of the double rod cylinder shown in FIG. 7A.
Figure 8:
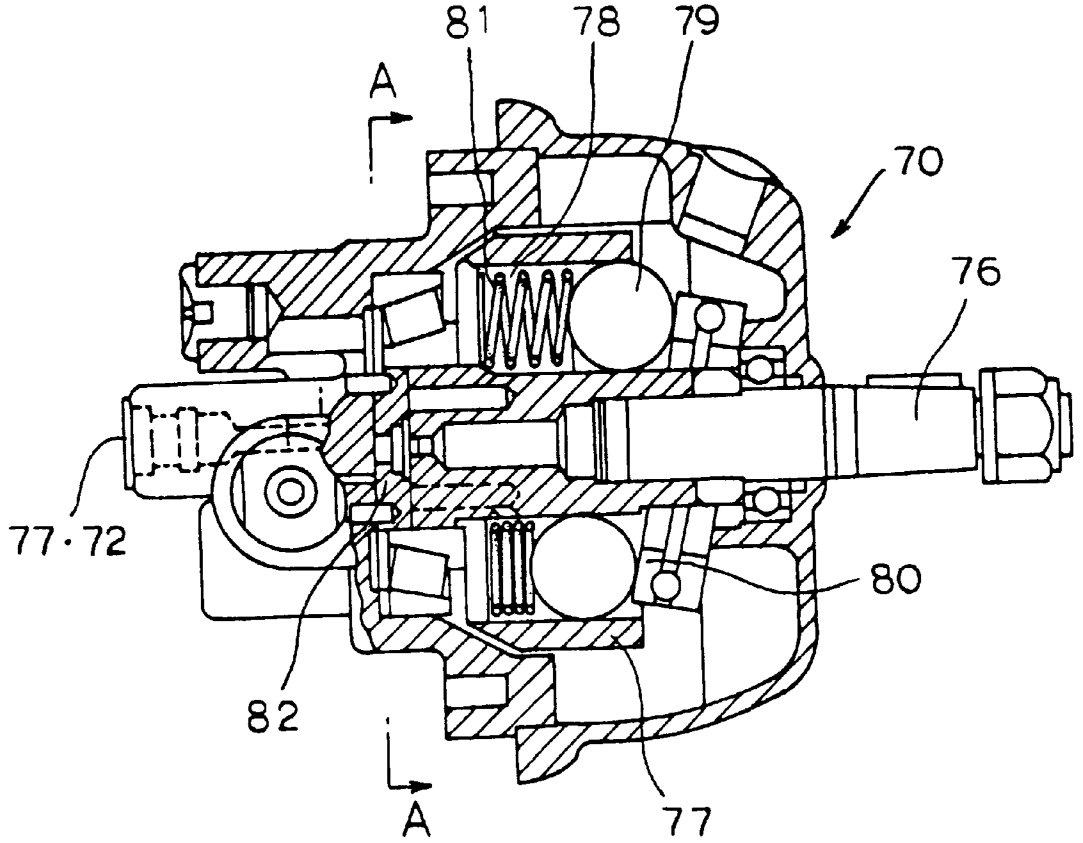
Fig.8 PRIOR ART
FIG. 8 is a central axial cross section of a conventional general hydraulic piston pump.

As apparent from the internal structure of the single rod cylinder 31 shown in FIG. 6B, the chamber 31*a*-R on the right side of the piston 31*c* in the cylinder 31 is larger in volume than the chamber 31*a*-L on the left side when the piston 31*c* is positioned in the middle of the cylinder 31. Therefore, when the piston rod 31*b* is moved over the same distance in both directions, the number of revolutions of the steering wheel 40 coupled to the conventional manual piston pump (FIG. 8) differs between the directions. If the pump 1 of this embodiment is used, however, the required number of revolutions of the wheel 40 is equal between the directions. In this case, when pressure oil is supplied to the left cylinder chamber 31*a*-L, the excess oil depending on the difference in volume between the chambers 31*a*-L and 31*a*-R is discharged through the tank ports 11*c* and 11*d* of the distributing valve 11 into the tank 8. On the other hand, when pressure oil is sucked from the left chamber 31*a*-L, the oil corresponding to the difference is sucked from the tank 8 through the tank ports 11*c* and 11*d* into the pump cylinders 6.

When pressure oil is discharged from the B port 16 of the pump 1 into the right cylinder chamber 31*a*-R, the flow control valve 14 is moved to its left end position by a pilot pressure from the right. Accordingly, pressure oil is discharged through the B port 16, and at the same time, pressure oil is sucked through the A port 15 into the pump cylinders 6 and the tank 8. As stated above, the inner side of the fixed cam plate 9 is a cam face 9*a*. As also stated, the strokes of the ball pistons 7 are modified, as shown in FIG. 3A, to prevent each pump cylinder 6 from changing over between the B port 11*b* and the tank port 11*c* or 11*d* of the distributing valve 11 when the associated ball piston 7 changes its direction of movement. Accordingly, the pistons 7 operate smoothly. As a result, the remote steering system 30 including the hydraulic piston pump 1 of the invention has such structure that, in a conventional remote steering system with a single rod cylinder, only the manual hydraulic piston pump has been replaced. Besides, the same number of revolutions of the steering wheel 40 in both directions moves the piston rod 31*b* of the single rod cylinder 31 over the same distance in both directions to steer the boat. Therefore, the operation of the system is simple and needs no skill. In addition, the system is not complicated in structure, and it is possible to provide the newest remote steering system cheaply.

FIGS. 4A–4D show a manual hydraulic piston pump 21 according to another embodiment, which includes a cylinder block 23, a distributing valve 22 and a swash plate (not shown). The pump 21 differs from the pump 1 of the first embodiment as follows.

Figure 4A:
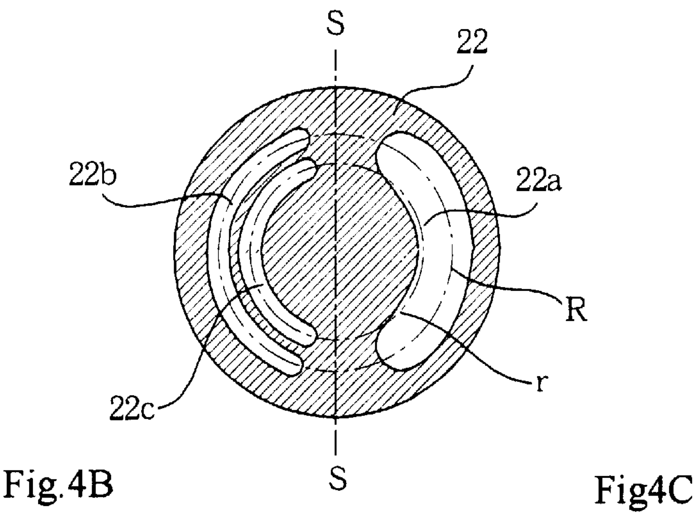
FIG. 4A is a radial cross section of the distributing valve of a manual hydraulic piston pump according to the second embodiment.

As shown in FIG. 4A, the distributing valve 22 has an A port 22*a*, a B port 22*b* and a tank port 22*c* all formed through it. The tank port 22*c* communicates with an oil tank 8(in FIG. 2). The three ports are circular or arcuate, and equal in circumferential length (circumferential angle). The A port 22*a* is wide and positioned on the right of the center line S—S of the valve 22. The B port 22*b* is fairly narrower than the A port 22*a* and positioned on the left of the center line. The tank port 22*c* is narrow and positioned inside the B port 22*b*. The B port 22*b* extends on a circle R, which is concentric with the block 23. The tank port 22*c* extends on a circle r, which is concentric with and smaller in diameter than the circle R. The A port 22*a* extends on both circles R and r.

Figure 4B:
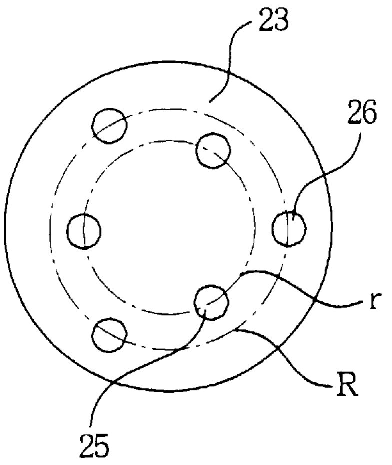
FIG. 4B is a view taken along line b—b of FIG. 4D, showing the back side of the cylinder block.
Figure 4C:
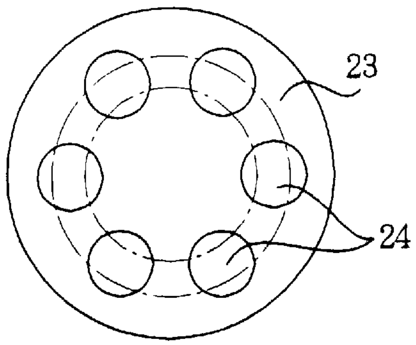
FIG. 4C is a view taken along line c—c of FIG. 4D, showing the front side of the cylinder block.
Figure 4D:
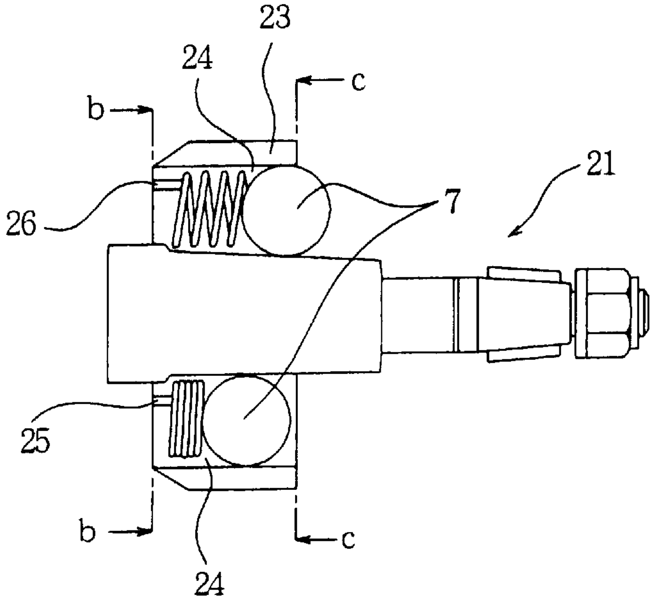
FIG. 4D is a schematic axial cross section of the cylinder block according to the second embodiment.

As shown in FIGS. 4C and 4D, the cylinder block 23 has six cylinders 24 formed in it at circumferential regular intervals. A ball piston 7 can move in each cylinder 24. As shown in FIG. 4B, the block 23 also has six cylinder ports 25 and 26 formed in its bottom. Each of the ports 25 and 26 communicates with one of the cylinders 24. The three ports 25 are positioned at regular intervals on the circle r. These cylinder ports 25 can communicate with the ports 22*a* and 22*c* of the distributing valve 22. The other three ports 26 are positioned at regular intervals on the circle R. These cylinder ports 26 can communicate with the ports 22*a* and 22*b* of the valve 22.

This pump 21 is otherwise common in structure to the pump 1.

This pump 21 can be used in place of the pump 1 for the remote steering system 30. In this case, when pressure oil is discharged from the pump 21 into the left chamber 31*a*-L of the single rod cylinder 31, the excess oil depending on the difference in volume between the cylinder chambers 31*a*-L and 31*a*-R is discharged through the tank port 22*c* of the distributing valve 22 into the tank 8. Therefore, in the remote steering system 30 (FIG. 6A), the required number of revolutions of the steering wheel 40 is equal in both directions. As shown in FIG. 4A, the ends of the ports 22*a*, 22*b* and 22*c* of the valve 22 are spaced circumferentially or angularly from the center line S—S. Differently from the foregoing embodiment, these port ends are out of the positions where the ball pistons 7 change their directions of movement. Therefore, differently from the foregoing embodiment, it is not necessary for the swash plate to be a cam plate fixed to the pump casing (not shown). Consequently, the swash plate can be a bearing type swash plate which is similar to the swash plate 80 (FIG. 8) of the conventional pump 70. In this case, the pistons 7 can reciprocate more smoothly.

FIGS. 5A–5D show a manual hydraulic piston pump 51 according to a further embodiment, which includes a cylinder block 53, a distributing valve 52 and a bearing type swash plate (not shown). The pump 51 differs from the pumps 1 and 21 of the foregoing embodiments as follows.

Figure 5A:
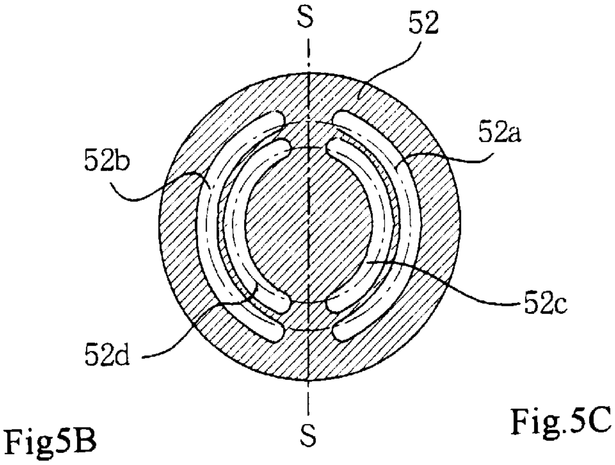
FIG. 5A is a radial cross section of the distributing valve of a manual hydraulic piston pump according to the third embodiment.

As shown in FIG. 5A, the distributing valve 52 has an A port 52*a*, a B port 52*b*, an A' port 52*c* and a B' port 52*d* all formed through it. The four ports are narrow and circular or arcuate. The ports 52_a_ and 52_c_ on the right of the center line S—S of the valve 52 are symmetric around the line with the ports 52_b_ and 52_d_ on the left, respectively. The ports 52_c_ and 52_d_ are positioned inside the ports 52_a_ and 52_b_, respectively. The B' port 52_d_ is a tank port, which communicates with an oil tank 8(in FIG. 2). The ports 52_a_ and 52_b_ extend on a circle R, which is concentric with the cylinder block 53. The ports 52_c_ and 52_d_ extend on a circle r, which is concentric with and smaller in diameter than the circle R.

Figure 5B:
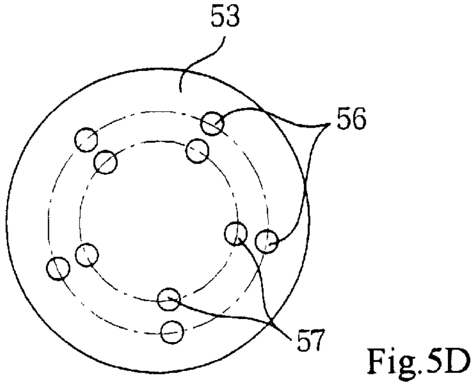
FIG. 5B is a view taken along line b—b of FIG. 5D, showing the back side of the cylinder block.
Figure 5C:
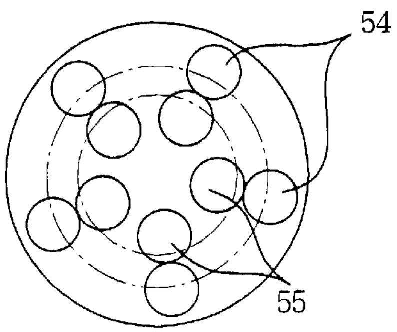
FIG. 5C is a view taken along line c—c of FIG. 5D, showing the front side of the cylinder block.
Figure 5D:
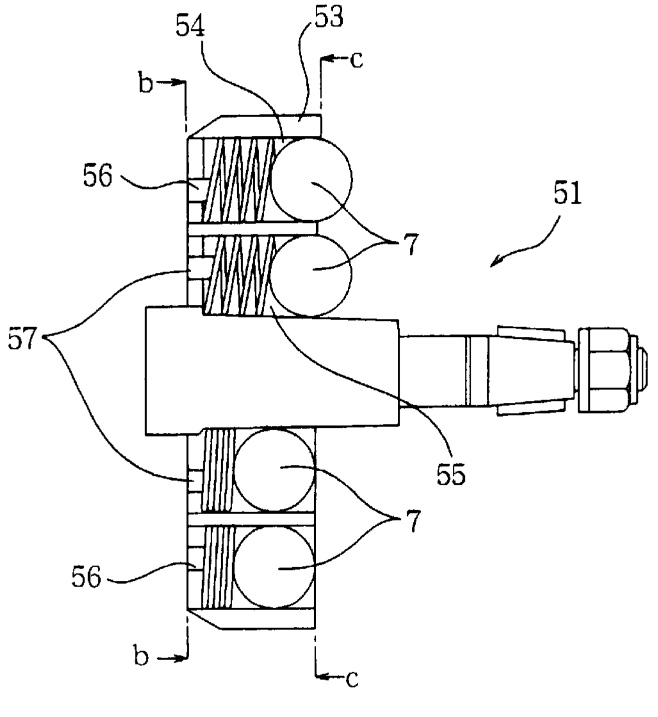
FIG. 5D is a schematic axial cross section of the cylinder block according to the third embodiment.

As shown in FIGS. 5C and 5D, the cylinder block 53 has ten cylinders 54 and 55 formed in it. The five cylinders 54 are positioned at circumferential intervals on the larger circle R. The other five cylinders 55 are positioned at circumferential intervals on the smaller circle r. A ball piston 7 can slide in each cylinder 54 and 55. The pistons 7 of the cylinders 54 and 55 are urged against the swash plate each by a coil spring 10. As shown in FIG. 5B, the cylinder block 53 also has cylinder ports 56 and 57 formed in its bottom. The ports 56 each communicate with one of the outer cylinders 54, and are positioned on the circle R for communication with the outer ports 52_a_ and 52_b_ of the distributing valve 52. The other cylinder ports 57 each communicate with one of the inner cylinders 55, and are positioned on the circle r for communication with the inner ports 52_c_ and 52_d_ of the valve 52.

Similarly to the embodiment of FIGS. 4A–4D, the ends of the ports 52_a_–52_d_ of the distributing valve 52 are angularly spaced fairly away from the center line S—S of the valve 52, as shown in FIG. 5A. Therefore, the swash plate can be a bearing type swash plate which is similar to the swash plate 80 (FIG. 8) of the conventional pump 70. Otherwise, the pump 51 is common in structure to the first embodiment.

This pump 51 can be used in place of the pump 1 for the remote steering system 30. In this case, when pressure oil is discharged from the pump 51 into the left chamber 31_a_-L of the single rod cylinder 31, the excess oil depending on the difference in volume between the cylinder chambers 31_a_-R and 31_a_-L is discharged through the tank port 52_d_ of the distributing valve 52 into the tank 8. Accordingly, the required number of revolutions of the steering wheel 40 is equal in both directions. Because the pump cylinders 54 and 55 and pistons 7 are large in number, however, the pump 51 is complicated in structure, and its production costs are somewhat high.

In place of a swash plate type piston pump or in-line piston pump, a bent axis type axial piston pump or angled piston pump might be used for the remote steering system 30.

The invention can be applied to, not only a hydraulic pump of the ball piston and side plate type according to each of the embodiments, but also a hydraulic pump of the plunger and pintle type.

A hydraulic piston pump according to the invention can be applied to, not only a remote steering system as described above, but also a system in which it is necessary to discharge different amounts of pressure oil in the opposite directions of rotation of the pump.

What is claimed is:

1. A remote steering system for operating a rudder remotely in accordance with the direction of rotation and the number of revolutions of a steering wheel, the system comprising:

a hydraulic piston pump which is selectively driven by the wheel; and a hydraulic single rod cylinder connected to the pump, the cylinder including a piston rod, which requires different amounts of pressure oil for the same length of movement in opposite directions;

the pump being adapted to discharge the required different amounts of pressure oil so that the same number of revolutions of the wheel in both directions moves the rod by the same distance in both directions, whichever direction the wheel turns in.

2. The remote steering system defined in claim 1, wherein the hydraulic piston pump includes a distributing valve having:

a pair of first ports, through one of which the amount of pressure oil to be discharged from and sucked into the pump is controlled in accordance with the ratio of the amount of pressure oil necessary to move the piston rod by a distance in one of the directions to that necessary to move the rod by the same distance in the other of the directions; and a second port of a size corresponding to the controlled amount of pressure oil.

3. A manual hydraulic piston pump comprising:

a generally cylindrical cylinder block having a plurality of cylinders formed around the axis thereof at circumferential intervals;

pistons each for reciprocating in one of the cylinders;

a swash plate positioned at one end of the cylinder block;

springs each urging one of the pistons toward and against the swash plate;

a distributing valve positioned at the other end of the cylinder block, the valve having a pair of arcuate ports and a pair of tank ports;

the cylinder block being rotatable on the axis relatively to at least part of the swash plate and the distributing valve;

each of the cylinders being able to communicate with one of the ports of the distributing valve while the cylinder block is turning around the axis;

a flow control valve having a pilot connected to the arcuate ports of the distributing valve; and a tank communicating with the tank ports of the distributing valve;

the pistons being moved axially in the cylinders while the cylinder block is turning around the axis, to discharge pressure oil from at least one of the cylinders through at least one of the ports of the distributing valve and, on the other hand, suck pressure oil through at least one other port into at least one other cylinder;

one of the arcuate ports being shorter circumferentially than the other to reduce, by a predetermined amount, the amount of pressure oil to be discharged from and sucked into the pump therethrough;

the tank ports being positioned circumferentially on both sides of the shorter arcuate port, the tank ports having circumferential dimensions corresponding to the predetermined amount.

4. The manual hydraulic piston pump defined in claim 3, wherein the cylinder block is supported rotatably in the pump, and the swash plate of non bearing type is fixed in the pump.

5. The manual hydraulic piston pump defined in claim 3, wherein the swash plate has a cam face for making each of the pistons substantially immovable for a range of rotation of the cylinder block where the piston changes the direction of movement thereof.

6. The manual hydraulic piston pump defined in claim 5, wherein the cylinder block is supported rotatably in the pump, and the swash plate of non bearing type is fixed in the pump.

7. The manual hydraulic piston pump defined in claim 3, wherein the arcuate ports of the distributing valve extend on a circle, which is concentric with the cylinder block, the tank ports extending across the circle;

the cylinder block having cylinder ports each for communicating with one of the ports of the distributing valve, the cylinder ports each communicating with one of the cylinders, the cylinder ports being positioned on the circle.

8. The manual hydraulic piston pump defined in claim 7 wherein the cylinder block is supported rotatably in the pump, and the swash plate of non bearing type is fixed in the pump.

9. A manual hydraulic piston pump comprising:

a generally cylindrical cylinder block having a plurality of cylinders formed around the axis thereof at circumferential intervals, the block also having cylinder ports formed in on end thereof, each of which communicates with one of the cylinders;

pistons each for reciprocating in one of the cylinders;

a swash plate positioned at the outer end of the cylinder block;

springs each urging one of the pistons toward and against the swash plate;

a distributing valve positioned at the one end of the cylinder block, and having a pair of first arcuate ports and a second arcuate port;

the cylinder block being rotatable on the axis relatively to at least part of the swash plate and the distributing valve;

each of the cylinder ports being able to communicate with one of the ports of the distributing valve while the cylinder block is turning around the axis;

a flow control valve having a pilot connected to the first ports of the distributing valve; and a tank communicating with the second port of the distributing valve;

the pistons being moved axially in the cylinders while the cylinder block is turning around the axis, to discharge pressure oil from at least one of the cylinders through at least one of the ports of the distributing valve and, on the other hand, suck pressure oil through at least one other port into at least one other cylinder;

one of the first ports being narrower than the other to reduce, by a predetermined amount, the amount of pressure oil to be discharged from and sucked into the pump therethrough, the second port having a circumferential length corresponding to the predetermined amount;

the wider first port extending on both of two circles which are concentric with the cylinder block and different in diameter, the narrower first port extending on one of the circles, and the second port extending on the other;

each of the cylinder ports being positioned on one of the circles, at least one of the cylinder ports being positioned on one of the circles, at least one other cylinder port being positioned on the other circle.

10. The manual hydraulic piston pump defined in claim 9, wherein the cylinder block is supported rotatably in the pump, and the swash plate of bearing type is fixed in the pump.

11. A manual hydraulic piston pump comprising:

a generally cylindrical cylinder block having first cylinders formed at intervals on a first circle, which is concentric with the block, and second cylinders formed at intervals on a second circle, which is concentric with and smaller in diameter than the first circle;

pistons each for reciprocating in one of the cylinders;

a swash plate positioned at one end of the cylinder block;

springs each urging one of the pistons toward and against the swash plate;

a distributing valve positioned at the other end of the cylinder block, and having a pair of first arcuate ports, a second arcuate port and a third arcuate port;

one of the first ports extending on the first circle, which is concentric with the cylinder block, the second port extending on the second circle, the other first port extending on one of the first and second circles, and the third port extending on the other circle;

the cylinder block being rotatable on the axis relatively to at least part of the swash plate and the distributing valve;

each of the cylinders being able to communicate with one of the ports of the distributing valve while the cylinder block is turning around the axis;

a flow control valve having a pilot, and connected to the first and second ports of the distributing valve; and a tank communicating with the third port of the distributing valve;

the pistons being moved axially in the cylinders while the cylinder block is turning around the axis, to discharge pressure oil from at least one of the cylinders through at least one of the ports of the distributing valve and, on the other hand, suck pressure oil through at least one other port into at least one other cylinder.

12. The manual hydraulic piston pump defined in any one of claim 11, wherein the cylinder block is supported rotatably in the pump, and the swash plate of bearing type is fixed in the pump.

13. The manual hydraulic piston pump defined in claim 11, wherein the cylinder block also has first and second cylinder ports formed in said other end thereof, the first cylinder ports being positioned on the first circle and each communicating with one of the first cylinders, the second cylinder ports being positioned on the second circle and each communicating with one of the second cylinders.

14. The manual hydraulic piston pump defined in claim 13, wherein the cylinder block is supported rotatably in the pump, and the swash plate of bearing type is fixed in the pump.

* * * * *